United States Patent
Bullock et al.

(10) Patent No.: US 12,449,622 B2
(45) Date of Patent: Oct. 21, 2025

(54) FIBEROPTICAL CABLE ASSEMBLIES AND INTERFACES FOR SPECTROMETERS

(71) Applicant: Verity Instruments, Inc., Carrollton, TX (US)

(72) Inventors: Larry Bullock, Carrollton, TX (US); Mike Whelan, Carrollton, TX (US); Mark Meloni, Carrollton, TX (US); William Elliott, Carrollton, TX (US); David Friedersdorff, Carrollton, TX (US)

(73) Assignee: Verity Instruments, Inc., Carrollton, TX (US)

( * ) Notice: Subject to any disclaimer, the term of this patent is extended or adjusted under 35 U.S.C. 154(b) by 308 days.

(21) Appl. No.: 18/178,421

(22) Filed: Mar. 3, 2023

(65) Prior Publication Data

US 2023/0280560 A1   Sep. 7, 2023

Related U.S. Application Data

(60) Provisional application No. 63/477,352, filed on Dec. 27, 2022, provisional application No. 63/317,461, filed on Mar. 7, 2022.

(51) Int. Cl.
*G02B 6/44* (2006.01)

(52) U.S. Cl.
CPC ......... *G02B 6/4431* (2023.05); *G02B 6/4471* (2013.01)

(58) Field of Classification Search
None
See application file for complete search history.

(56) References Cited

U.S. PATENT DOCUMENTS

| | | | | |
|---|---|---|---|---|
| 4,610,033 A | * | 9/1986 | Fox, Jr. | H01B 17/02 324/96 |
| 2003/0095774 A1 | * | 5/2003 | Bohme | G02B 6/442 385/135 |
| 2007/0222981 A1 | * | 9/2007 | Ponsardin | G01J 3/44 356/301 |
| 2018/0106852 A1 | * | 4/2018 | Eigner | G01R 31/1272 |

(Continued)

FOREIGN PATENT DOCUMENTS

| | | |
|---|---|---|
| CN | 203722191 U | 7/2014 |
| CN | 207250182 U | 4/2018 |
| CN | 109343178 A | 2/2019 |

(Continued)

*Primary Examiner* — Jerry Rahll

(57) ABSTRACT

The disclosure provides an improved fiber optic cable assembly that can protect spectrometers against one or more of the external noise and discharge sources. The improved fiber optic cable assembly provides electrical isolation and/or insulation (EII) protection for optical instruments, such as a spectrometer, in which the fiber optic cable assembly is terminated. The EII protection can include one or more of a non-conductive sheathing at least partially covering the termination and the sheathing, a dielectric break providing electrical isolation between the termination and the sheathing, an isolation boot, and a grounding tether. In one example a fiber optical cable assembly includes: (1) a termination, (2) sheathing, and (3) a dielectric break providing electrical isolation between the termination and the sheathing. A fiber optically coupled system having an improved fiber optic cable assembly is also disclosed.

30 Claims, 9 Drawing Sheets

(56) References Cited

U.S. PATENT DOCUMENTS

2021/0364709 A1   11/2021   Takeuchi et al.

FOREIGN PATENT DOCUMENTS

| CN | 109870774 A | 6/2019 |
| JP | H0511145 A | 1/1993 |
| JP | 2001305390 A | 10/2001 |
| JP | 2013507615 A | 3/2013 |

* cited by examiner

CAN SLIDE ALONG FIBER
OPTICAL CABLE ASSEMBLY

FIBEROPTICAL CABLE ASSEMBLIES AND INTERFACES FOR SPECTROMETERS

CROSS-REFERENCE TO RELATED APPLICATION

This application claims the benefit of U.S. Provisional Application Ser. No. 63/317,461, filed by Larry Bullock et al., on Mar. 7, 2022, entitled "FIBEROPTIC CABLE ASSEMBLIES AND INTERFACES FOR SPECTROMETERS, and U.S. Provisional Application Ser. No. 63/477,352, filed by Larry Bullock et al., on Dec. 27, 2022, entitled "IMPROVED FIBEROPTIC CABLE ASSEMBLIES AND INTERFACES FOR SPECTROMETERS," both which are commonly assigned with this application and incorporated herein by reference in their entirety.

TECHNICAL FIELD

This application is directed, in general, to spectrometers and, more specifically, to fiber optical cable assemblies interfaced therewith.

BACKGROUND

Spectrometers and associated fiber optical cable assemblies are commonly used with semiconductor processing equipment for process and fault monitoring and other forms of metrology and process control, such as optical emission spectroscopy ("OES") and interferometric endpoint ("IEP"). In OES applications light emitted from the process, typically from plasmas, is collected and analyzed to identify and track changes in atomic and molecular species which are indicative of the state or progression of the process being monitored. In IEP applications, light is typically supplied from an external source, such as a flashlamp, and directed onto a workpiece. Upon reflection from the workpiece, the sourced light carries information, in the form of the reflectance of the workpiece, which is indicative of the state of the workpiece. Light from the OES or IEP applications is typically provided to a spectrometer via a fiber optical cable assembly for processing and understanding of the semiconductor processes.

SUMMARY

In one aspect, the disclosure provides a fiber optical cable assembly. In one example the fiber optical cable assembly includes: (1) a termination, (2) sheathing, and (3) a dielectric break providing electrical isolation between the termination and the sheathing.

The disclosure also provides another fiber optical cable assembly in another aspect. In one example, this fiber optical cable assembly includes: (1) a termination, (2) sheathing, and (3) electrical isolation/insulation (EII) protection for at least one of the termination and the sheathing.

In yet another aspect, the disclosure provides a fiber optically coupled system. In one example the fiber optically coupled system comprises: (1) a spectrometer and (2) a fiber optic cable assembly coupled to the spectrometer, wherein the fiber optic cable assembly includes (2A) a termination, (2B) sheathing, and (2C) electrical isolation/insulation (EII) protection for the spectrometer, wherein the EII protection is used with at least one of the termination and the sheathing.

BRIEF DESCRIPTION

Reference is now made to the following descriptions taken in conjunction with the accompanying drawings, in which.

DETAILED DESCRIPTION

The complex environment of semiconductor processing equipment poses certain risks and constraints on the integration and use of spectrometers and associated fiber optical cable assemblies. For example, semiconductor tools pose harsh environmental conditions of maximum temperature and temperature variation, risk of physical damage, varied low and high voltage discharges, and a wide range of potentially interfering radio frequency emissions from DC throughout the low KHz and into the GHz regime. These conditions require spectrometers and associated fiber optical cable assemblies that are designed to safely and reliably operate within this environment with appropriate immunity.

Figure 1:
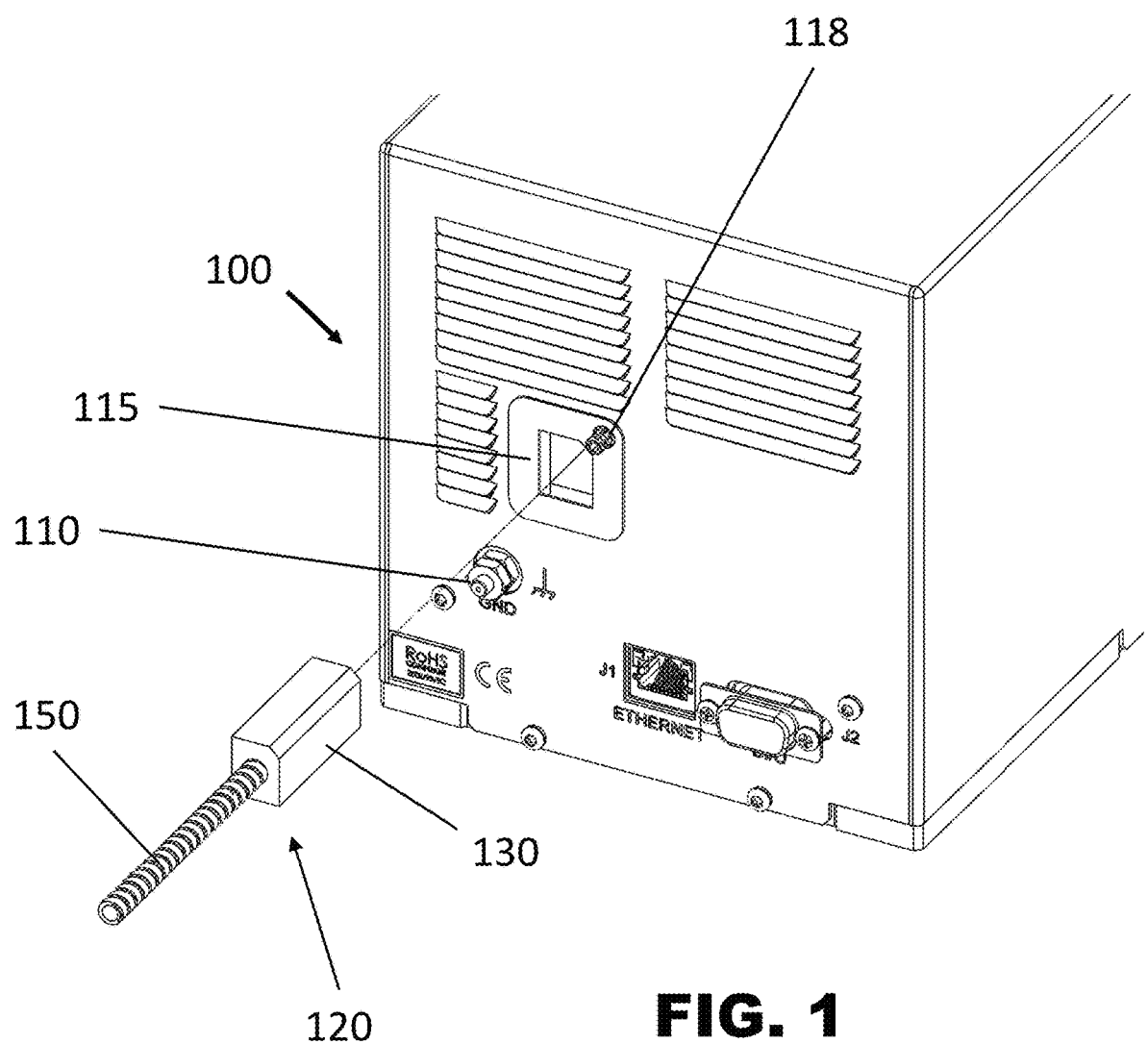
FIG. 1 is an oblique view of a spectrometer with an associated fiber optical cable assembly shown disengaged therefrom.
Figure 2:
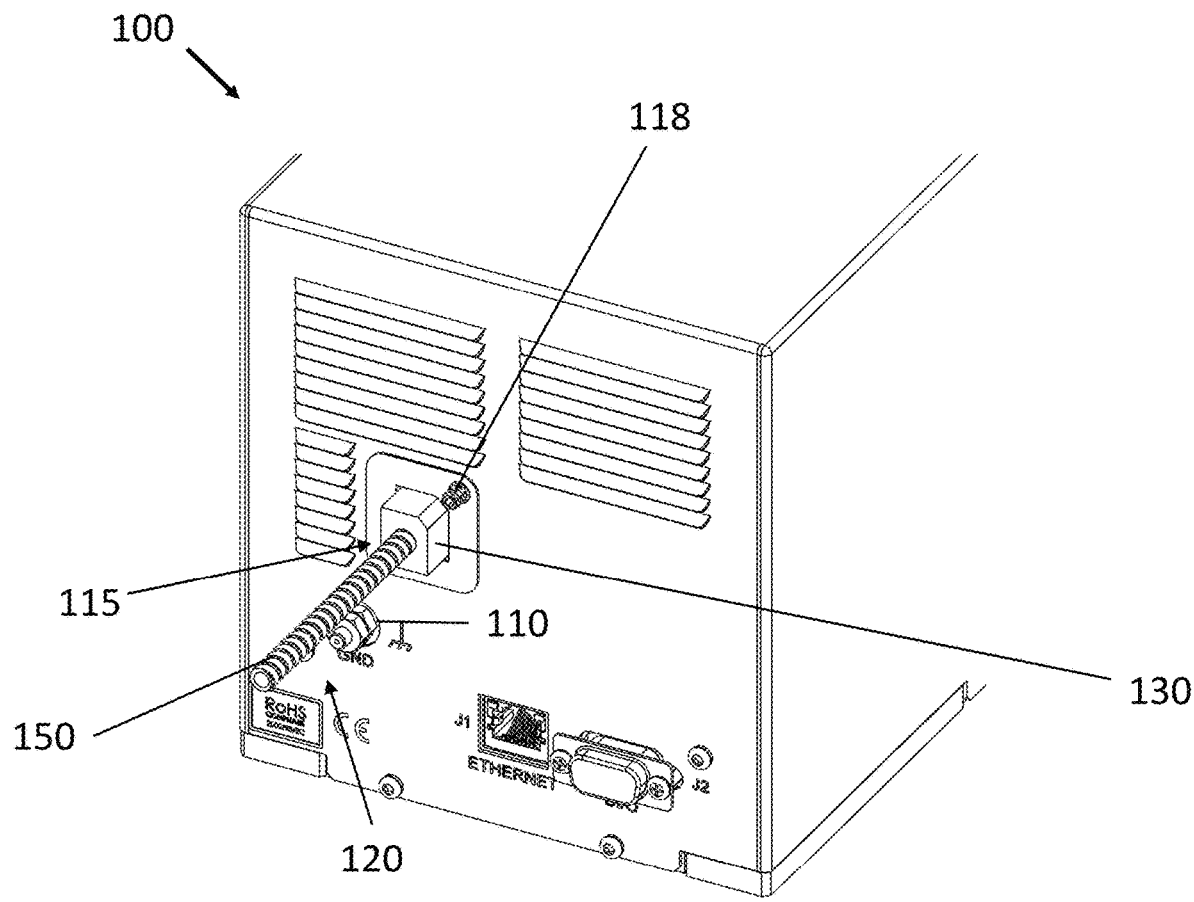
FIG. 2 is an oblique view of a spectrometer with an associated fiber optical cable assembly engaged therewith.

FIGS. 1 and 2 illustrate an example of a fiber optically coupled system having a fiber optic cable assembly and spectrometer that are used to demonstrate potential problems. The fiber optically coupled system can be measurement systems used with, for example, semiconductor processing. FIG. 1 is an oblique view of an example of a spectrometer 100 with associated fiber optical cable assembly 120 shown disengaged therefrom. The spectrometer 100 includes a grounding lug 110, a fiber optical access 115, and retaining means or retainer 118. The spectrometer 100 also includes additional visible features that are common to such spectrometers, such as interfaces and vents.

Spectrometer 100 may be, for example, an SD1024G-series spectrometer as available from Verity Instruments, Inc. of Carrollton, Texas. Spectrometer 100 may be mounted within a cabinet or suspended near a semiconductor processing tool. Spectrometer 100 may commonly operate from a 24 VDC or 120 VAC power bus. Grounding lug 110 may be used to connect spectrometer 100 and a conductively-coupled fiber optical cable assembly connected thereto, such as fiber optical cable assembly 120, to a suitable ground potential reference.

As visible in FIG. 1, the fiber optic cable assembly 120 includes termination 130 and sheathing 150. To engage fiber optical cable assembly 120 with spectrometer 100, fiber optical cable assembly 120 may be inserted into fiber optical access 115. Retainer 118 may be used to secure the engagement of fiber optical cable assembly 120 to spectrometer 100.

FIG. 2 is an oblique view of spectrometer 100 with associated fiber optical cable assembly 120 shown engaged therewith. Termination 130 of fiber optical cable assembly 120 may be generally secured to spectrometer 100 by an appropriately mated coupler (not shown and essentially within spectrometer 100) by retainer 118. Retainer 118 can be, for example, a screw, cam or other mechanical device. Termination 130 and its mated coupler may be of the same material such as an aluminum alloy, for example 6061-T6, or stainless steel to provide robustness and secure mating over thermal cycling and thermal expansion variation. Sheathing 150 of fiber optical cable assembly 120 may generally be of a polymer or metal material but is commonly of flexible metal conduit, commonly called BX sheathing, for robustness and high damage resistance. An end (not shown) of fiber optical cable assembly 120, opposed to termination 130, may be routed about and connected with a portion of a semiconductor processing tool. The fiber optical cable assembly 120 can deliver light from the semiconductor processing tool to the spectrometer 100. A source of the light can be from OES or IEP applications. For example, a light source can be a flashlamp, which can be a source of noise due to high frequency and high current discharges that can create broad spectrum of noise. At one or more locations along its routing and connection fiber optical cable assembly 120 may be conductively and/or radiatively coupled to the semiconductor processing tool. This coupling may provide multiple pathways for transfer of stray currents and voltages that can have direct conductive routes to spectrometer 100. Additionally, as many semiconductor tools utilize RF signals for processing, such as RF plasma generation, a conductive fiber optical cable assembly, such as one with a metal sheathing, may directly act as an antenna for reception and transport of RF emissions from the semiconductor processing tool to the spectrometer 100 resulting in degraded performance.

Although secure and robust, the combination of termination 130 and sheathing 150 being composed of metal or other conductive materials poses substantial risk to connected spectrometers in semiconductor processing environments. Certain classes of risk may be associated with electrical discharges (ESD), and RF immunity (EMI). Being built from conductive materials, fiber optical cable assembly 120 may provide a direct electrical path for external signals to reach and damage or degrade the operation of sensitive components internal to spectrometer 100. Example internal components include optical slits, optical sensors, digitizer electronics and electronic signal conditioning components as well as signal processors. Commonly, internal components may share an electrical ground reference and/or have electrically contacting surfaces. For example, an optical sensor, such as the S7031 charge-coupled device (CCD) available from Hamamatsu of Japan, may be packaged into a conductive frame that is connected to a body of the optical head of the spectrometer and also to internal electronics. An optical slit, most commonly made of thin metal, may be in direct mechanical and electrical contact with termination 130 and with other conductive components either/both internal and external to spectrometer 100. Furthermore, retainer 118 or another retaining mechanism for fiber optical cable assembly 120 may provide conductive pathways into spectrometer 100 for invasive signals. To negate the conductive pathway supporting intrusion of deleterious signals into spectrometer 100, changes to existing fiber optical cable assembly 120 and to spectrometer 100 itself may be provided.

The disclosure describes improvements related to spectrometers and associated fiber optical cable assemblies to improve the compatibility with the harsh environmental conditions posed in semiconductor processing environments. The disclosed improvements provide protection for spectrometers against multiple types of external noise and discharge sources that can be associated with fiber optic cable assemblies connected to the spectrometers. The external noise and discharge sources can be, for example, AC, DC, conductive, and radiative noise.

Advantageously, the disclosure provides an improved fiber optic cable assembly that can protect spectrometers against one or more of the external noise and discharge sources. The improved fiber optic cable assembly provides electrical isolation and/or insulation (EII) protection for optical instruments in which the fiber optic cable assembly is terminated. The EII protection can include one or more of a non-conductive sheathing at least partially covering the termination and the sheathing, a dielectric break providing electrical isolation between the termination and the sheathing, an isolation boot, and a grounding tether. The EII protection can include a combination of at least two of the non-conductive sheathing, the dielectric break, the isolation boot, and the grounding tether.

In addition to the external noise and discharge protection, the disclosed fiber optic cable assembly also maintains the stability of a rigid optical-mechanical connection with the spectrometers. Accordingly, light can be reliably delivered from, for example, OES or IEP applications, to the spectrometers.

Figure 3:
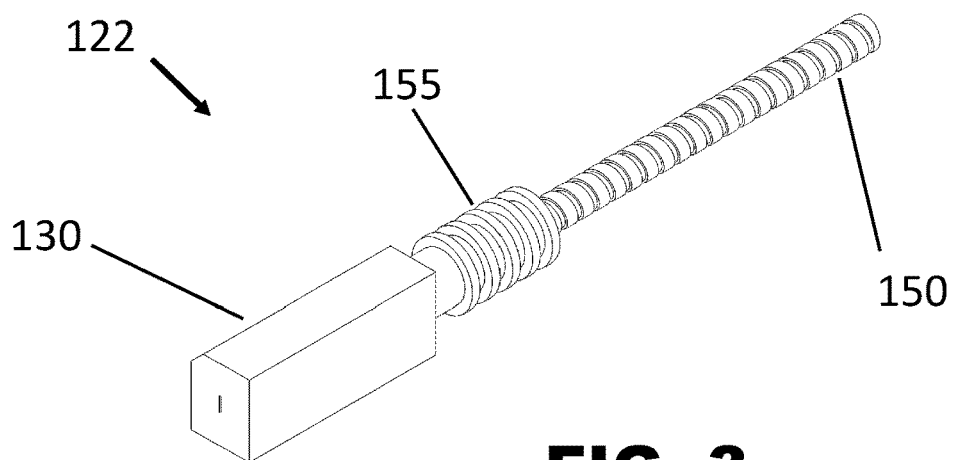
FIG. 3 is an oblique view of a fiber optical cable assembly including a dielectric break.

FIG. 3 is an oblique view of an example of an improved fiber optical cable assembly 122 including dielectric break 155 between termination 130 and sheathing 150. Dielectric break 155 provides electrical isolation between sheathing 150 and electrical signal sources connected thereto, and termination 130. The electrical signal sources can be any electrical signal sources connected thereto. When connected to a spectrometer, the dielectric break 155 also provides electrical isolation between the sheathing 150 and the spectrometer, such as spectrometer 100. Dielectric break 155 and other dielectric breaks disclosed herein may be of any suitable materials that provides at least the following performance: 1) maintains robust mechanical connection of termination 130 and sheathing 150, 2) provides sufficient dielectric barrier for expected discharges, and 3) maintains appropriate RF immunity.

Robust mechanical connectivity and dielectric barrier properties may be provided by non-conductive or substantially non-conductive materials, such as ceramics or polymers. Polymer and/or dielectric materials such as alumina, ultra high molecular weight (UHMW) polyethylene, PEEK (polyether ether ketone), epoxies, cycloaliphatic epoxy, and Delrin may be used. For example, a dielectric break made from PEEK with a thickness of 1 mm would resist a maximum discharge of 23 KV based upon a dielectric strength of 23 MV/m. For a dielectric break made from alumina (dielectric strength ~13 MV/m) a thickness (a break between 130 and 150, either coaxial or concentric) of approximately 2 mm would be required. Although dielectric break is shown located between termination 130 and sheathing 150, it should be understood that termination 130 and dielectric break 155 may be unified into a single non-conductive termination or that dielectric break may replace a portion of sheathing 150. The dielectric break 155 removes direct electrical contact between termination 130 and sheathing 150. Non-conductive sheathing, such as non-conductive sheathing 157 of FIG. 4, can go over the dielectric break 155. As such, a dielectric break can be exposed as shown in FIG. 3, can be under insulating sheathing 157, or integrated with termination 130.

Figure 4:
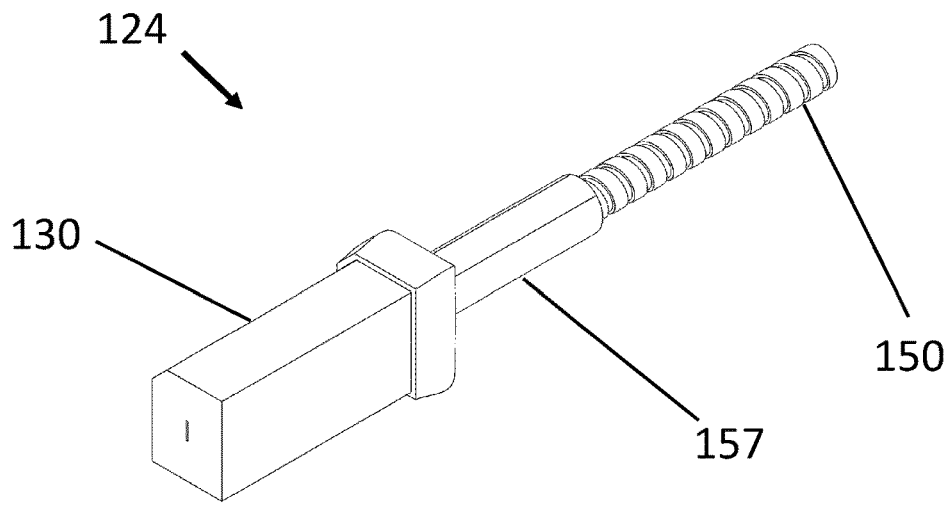
FIG. 4 is an oblique view of a fiber optical cable assembly including a dielectric break and insulating sheathing.

Additional isolation and protection from discharge may be provided by the inclusion of insulating sheathing applied to a fiber optical cable assembly as shown in example fiber optic cable assembly 124 of FIG. 4. Non-conductive sheathing 157 may be sufficiently extensive to cover any exposed portion of conductive termination 130 that may extend outside of a connected spectrometer and cover a sufficient length of sheathing 150 to avoid contact of sheathing 150 with the spectrometer. Given common bend radius limitations of BX sheathing, 3 to 10 inches of insulating sheathing 157 may be used. Non-conductive sheathing 157 may be based upon polyethylene or other suitable non-conductive polymer materials. Non-conductive sheathing 157 and other non-conductive sheathings disclosed herein can constructed of or include polyvinylidene difluoride (PVDF), polyethylene, polyvinyl chloride, polytetrafluoroethylene, fluorinated ethylene propylene, polypropylene, a rubber, neoprene, polyurethanes, silicone and polyolefins. Non-conductive sheathing 157 may also be used with a dielectric break, such as dielectric break 155 of FIG. 3.

Figure 5:
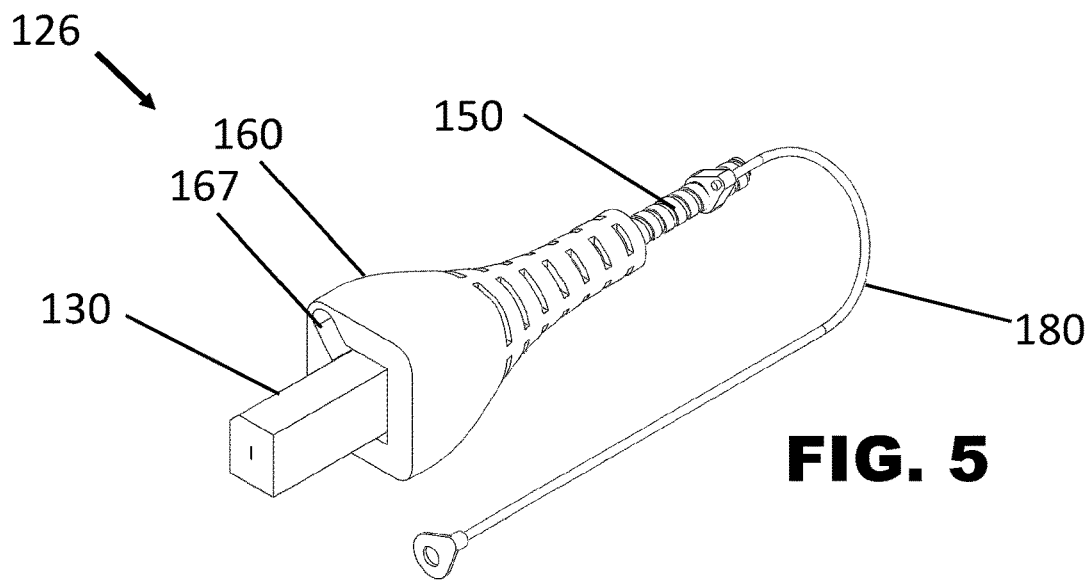
FIG. 5 is an oblique view of a fiber optical cable assembly including an isolating boot and grounding tether.

FIG. 5 is an oblique view of an example fiber optical cable assembly 126 including isolating boot 160 and grounding tether 180. When a dielectric break is used with a fiber optical cable assembly, the portion of sheathing 150 may be electrically floating near a spectrometer. To remove this lack of electrical termination, ground tether 180 may be connected between sheathing 150 and a grounding lug of the spectrometer, such as ground lug 110 of FIG. 1. Optionally, ground tether 180 may be connected to a connection point electrically separated from a spectrometer. Ground tether 180 may be, for example, a flexible copper grounding strap or cable providing a low resistance grounding path for suppression of electrical discharges and other signals occurring on a conductive portion of sheathing 150.

As noted above, a retainer, such as retainer 118 in FIGS. 1-2, for a fiber optical cable assembly may provide conductive pathways into a spectrometer for invasive signals. Accordingly, mitigation of access for this detriment may also be required. Mitigation may be achieved by recessing the retainer into the spectrometer and providing a suitable plug, cap, or other covering. As an alternative to non-conductive sheathing, such as sheathing 157 of FIG. 4, and an independent cover for a retainer, a non-conductive boot 160, may be used to restrict access to the conductive retainer and inhibit contact of conductive sheathing 150 to the spectrometer. In FIG. 5, non-conductive boot 160 includes a recess or notch 167 that fits over the retainer, such as retainer 118. The non-conductive boot 160 can slide along the fiber optic cable assembly 126 (for example along conductive sheathing 150) and be slid into place over the retainer once the termination 130 is connected to the spectrometer.

Figure 6:
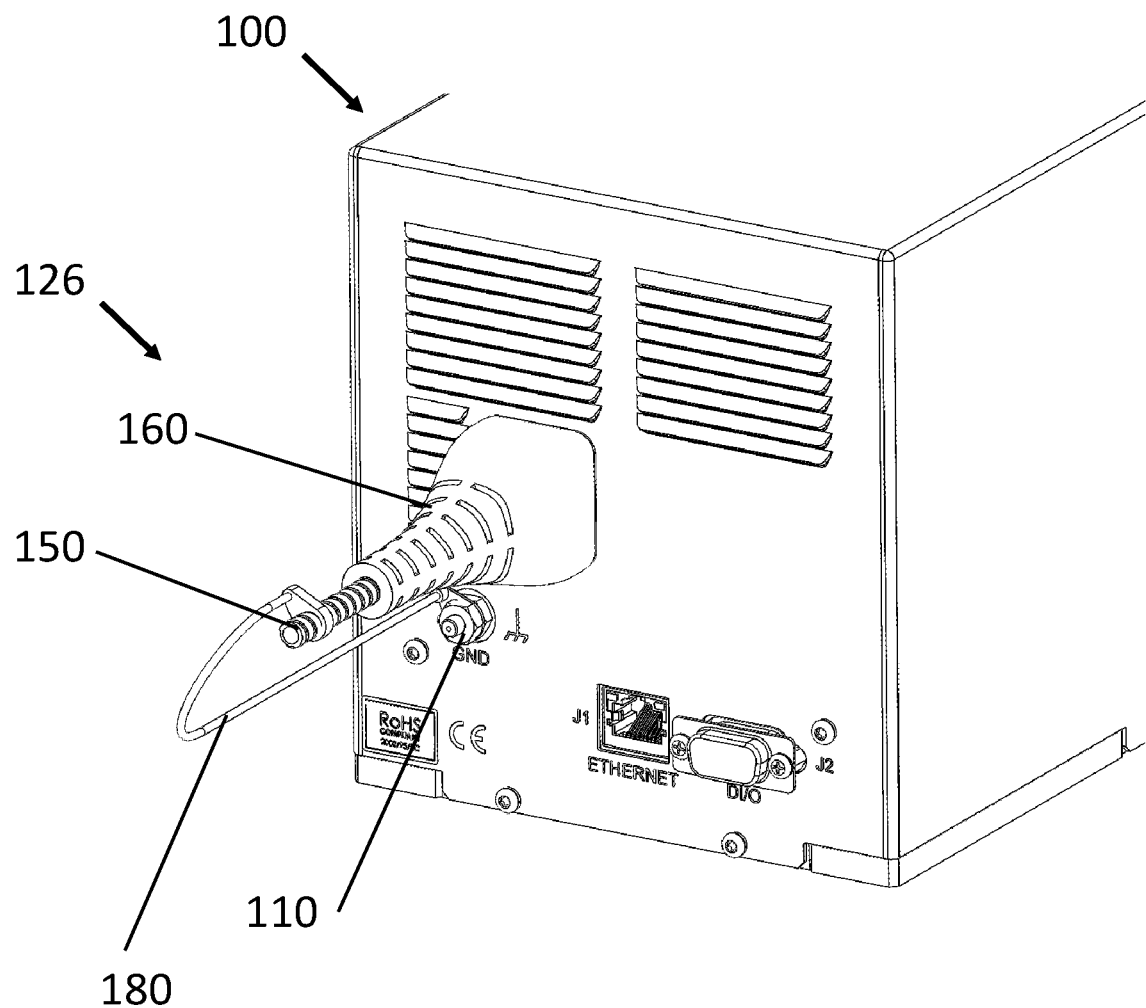
FIG. 6 is an oblique view of a spectrometer with an associated fiber optical cable assembly engaged therewith showing a grounding tether and an isolating boot.

FIG. 6 illustrates an example of fiber optic cable assembly 126 connected to spectrometer 100. In FIG. 6 the grounding tether 180 is shown engaged with the grounding lug 110 and the non-conductive boot 160 is positioned over the retainer 118 (not visible). The non-conductive boot 160 can be positioned flush and against the back of the spectrometer 100. For example, the non-conductive boot 160 can be slid into place.

FIGS. 3 to 6 demonstrate the improvements described herein to fiber optical cable assemblies and spectrometers with semi-custom rectangular terminations. Similar improvements may be applied to more standard fiber optical terminations such as SMA-series terminations. It should be noted that many common polymer fiber optical terminations such SC, LC, LX MU, and Biconic types are considered unsuitable for industrial use. Originally designed for telecom applications and smaller fiber diameters, they are generally not sufficiently industrially robust or supportive of large fiber bundles required for semiconductor metrology applications. It should also be noted that although the discussion hereinbelow is directed toward SMA terminated system, the described improvements may be applied to other standard connector types, such as, but not limited to ferrule connector (FC), angled physical contact (APC), Deutsch 1000, straight tip (ST) and other custom or semi-custom connectors.

Figure 7:
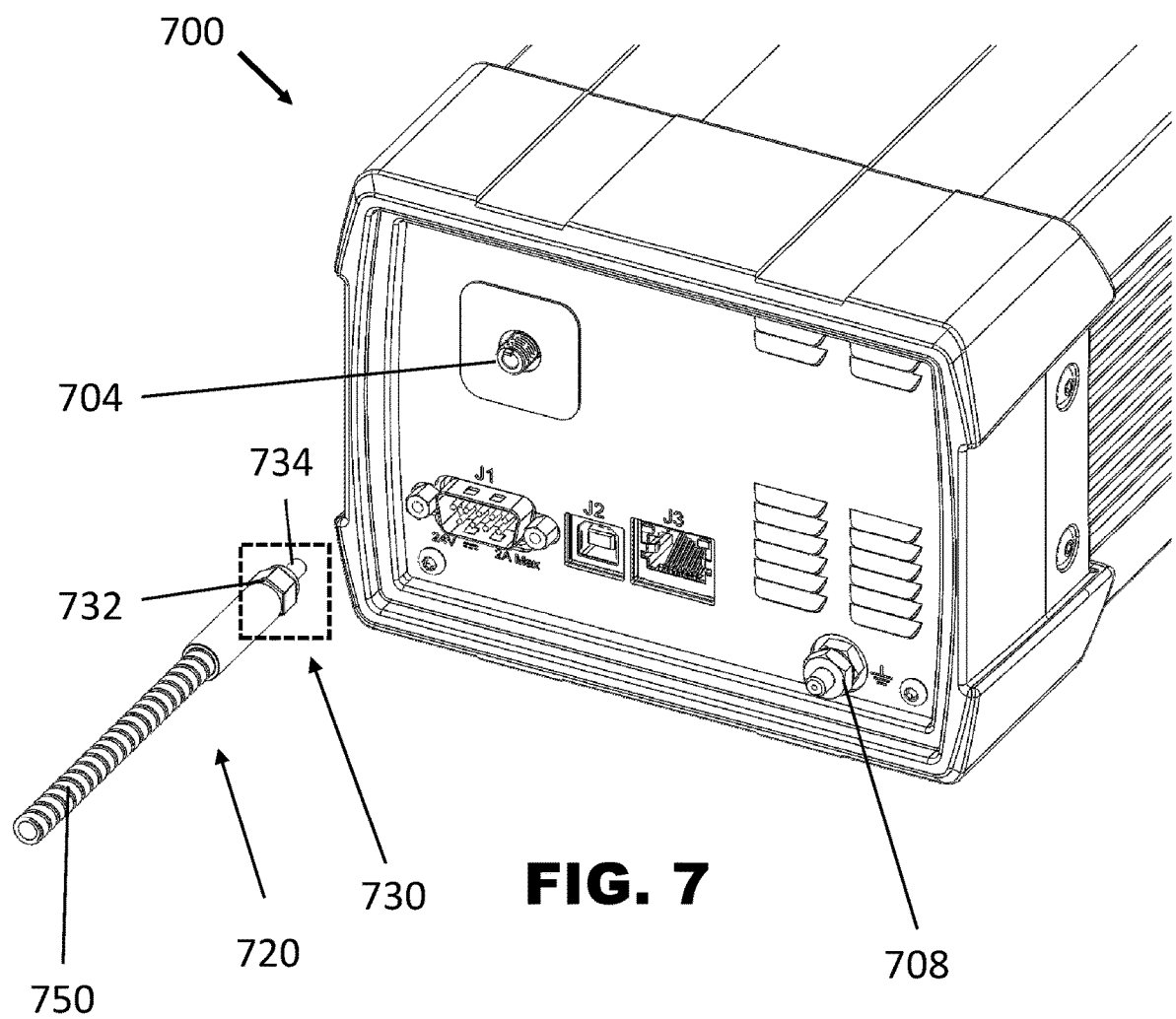
FIG. 7 is an oblique view of a subminiature version A (SMA) terminated spectrometer with an associated SMA terminated fiber optical cable assembly shown disengaged therefrom.
Figure 8:
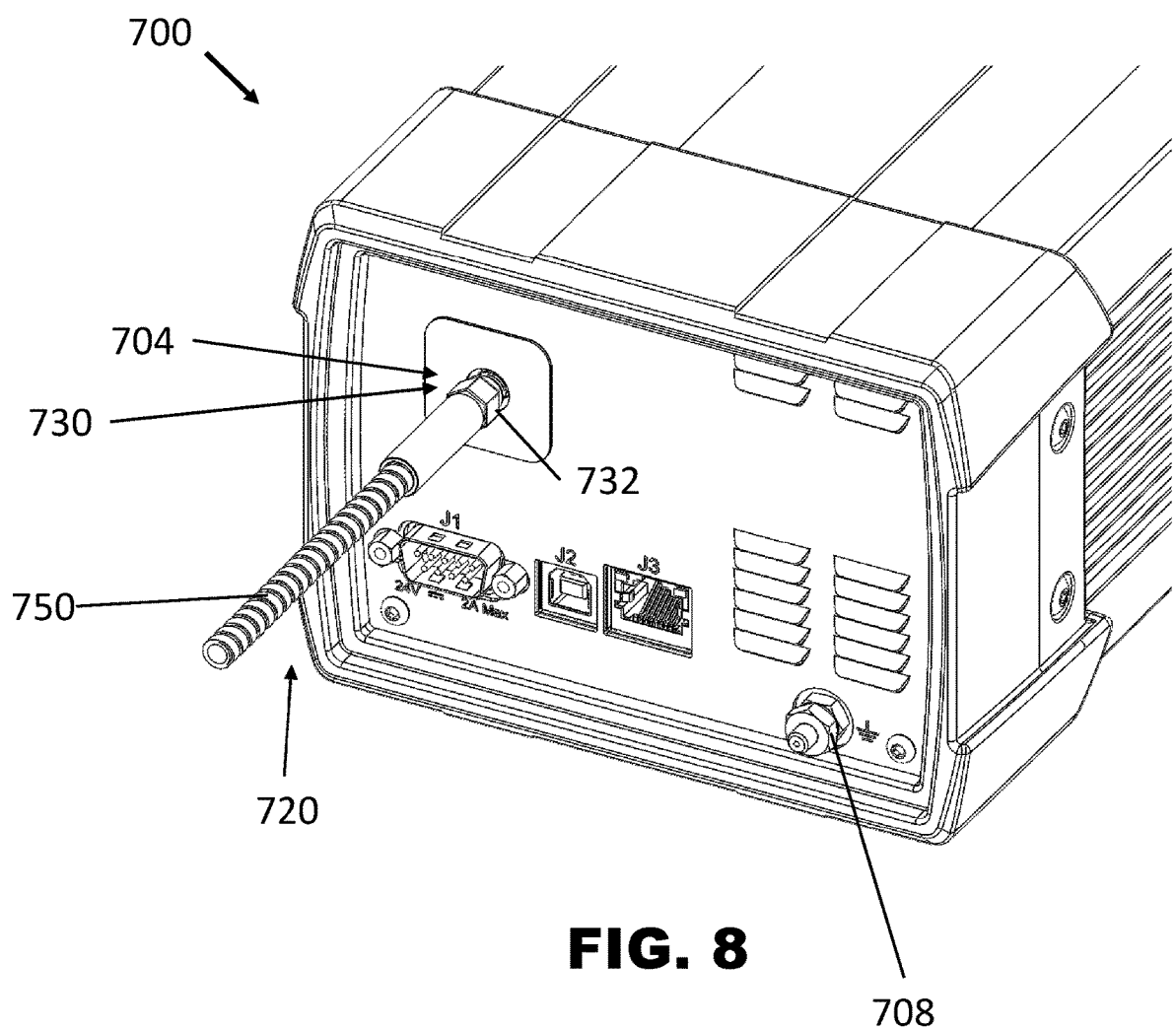
FIG. 8 is an oblique view of an SMA terminated spectrometer with an associated SMA terminated fiber optical cable assembly engaged therewith.

FIGS. 7 and 8 illustrate an example of a fiber optically coupled system having a SMA terminated spectrometer with an associated SMA terminated fiber optical cable assembly. The fiber optically coupled system can be measurement systems used with, for example, semiconductor processing. As such, the fiber optical cable assembly can deliver light from a semiconductor processing tool to the spectrometer. A source of the light can be from OES or IEP applications. For example, a light source can be a flashlamp.

FIG. 7 is an oblique view of an example SMA terminated spectrometer 700 with an associated SMA terminated fiber optical cable assembly 720 shown disengaged therefrom. Spectrometer 700 includes SMA connector 704 and grounding lug 708. The spectrometer 700 also includes additional visible features that are common to SMA terminated spectrometers, such as interfaces and vents.

The fiber optic cable assembly 720 includes a SMA connection assembly 730 and sheathing 750. The SMA connection assembly 730 includes a nut 732 and a ferrule 734. To engage fiber optical cable assembly 720 with spectrometer 700, the SMA connection assembly 730 mates with the SMA connector 704. The SMA connector 704 and the connection assembly 730 are commonly made from conductive metal materials and therefore pose similar problems as termination 130 of FIG. 1.

As shown in FIG. 8, when fiber optical cable assembly 720 is engaged with spectrometer 700, conductive SMA connection assembly 730 remains exposed and is in electrical contact with internal components of spectrometer 700. SMA terminations may use ceramic ferrules but these do not eliminate electrical contact as the SMA nut 732 and other internal components provide a parallel electrical path. As with fiber optical cable assembly 120, when sheathing 750 is conductive undesirable or harmful electrical signals have a direct electrical pathway into spectrometer 700 via fiber optical cable assembly 720.

Figure 9:
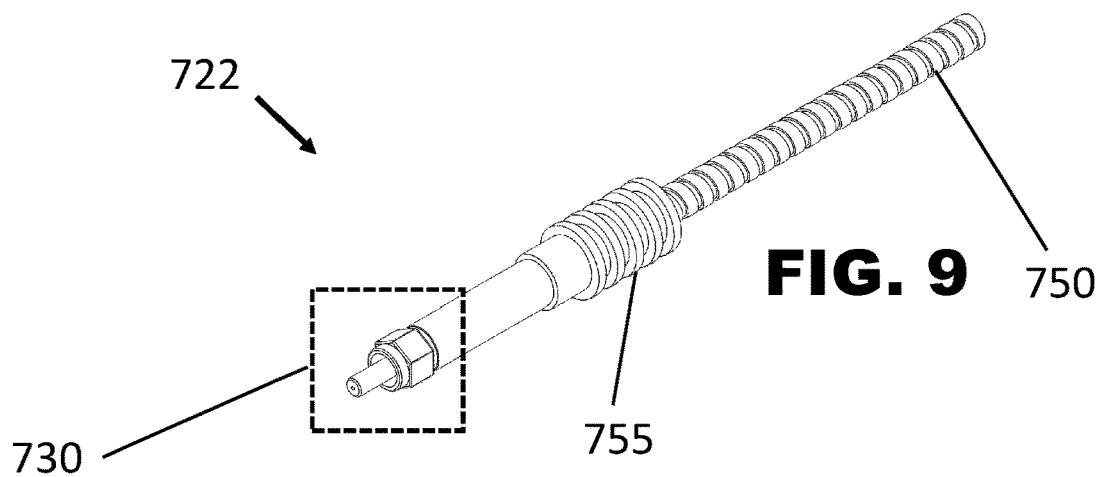
FIG. 9 is an oblique view of an SMA terminated fiber optical cable assembly including a dielectric break.
Figure 10:
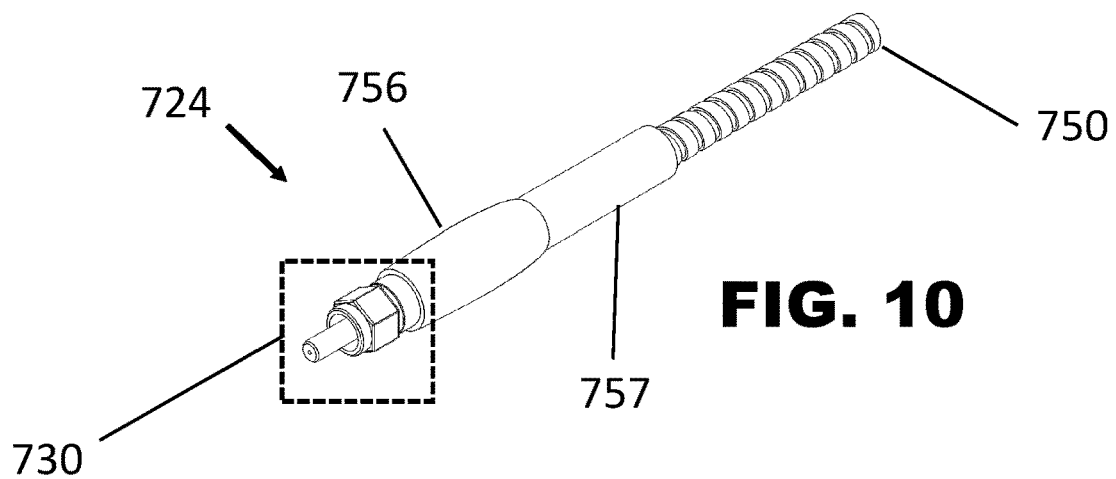
FIG. 10 is an oblique view of an SMA terminated fiber optical cable assembly including a dielectric break and insulating sheathing.

Similar to the constructions shown in FIGS. 3 and 4, dielectric breaks and insulating sheathing may be applied to SMA terminated fiber optical cable assemblies. FIG. 9 shows an example SMA terminated fiber optical cable assembly 722 including a dielectric break 755 located between SMA connection assembly 730 and sheathing 750. FIG. 10 shows an example SMA terminated fiber optical cable assembly 724 including a dielectric break 756 and insulating sheathing 757 covering portions of sheathing 750. The dielectric break 756 can be exposed as shown or located under insulating sheathing 757. Alternatively, SMA connection assembly 730 and other internal components may be made from a non-conductive material such as described herein above.

Figure 11:
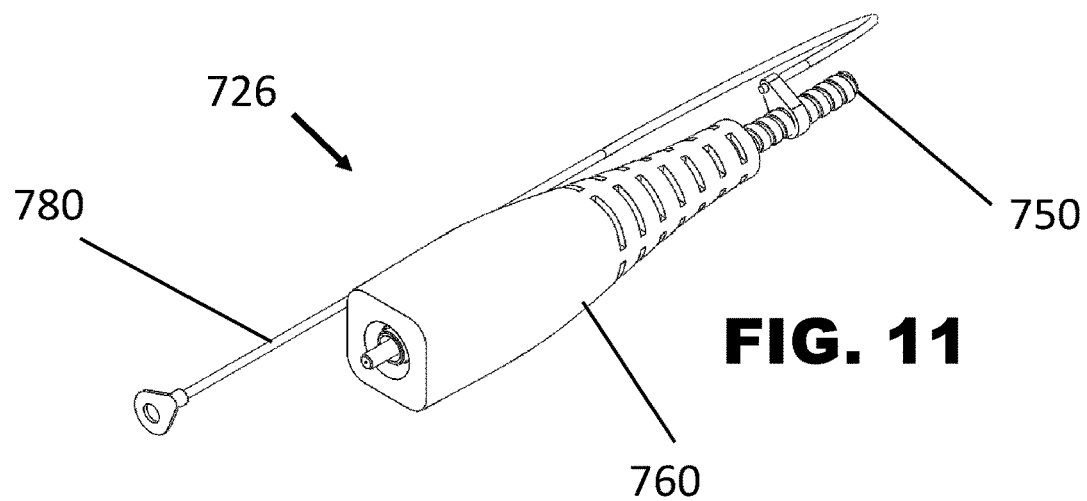
FIG. 11 is an oblique view of an SMA terminated fiber optical cable assembly including a grounding tether and an isolating boot.

FIG. 11 shows an oblique view of an example SMA terminated fiber optical cable assembly 726 including an isolating or non-conductive boot 760 and grounding tether 780. Non-conductive boot 760 may cover exposed portions of the SMA connection assembly 730 and extend sufficiently along sheathing 750 to reduce risk of electrical contact between sheathing 750 and spectrometers when connected thereto. Grounding tether 780 may be used to electrically connect conductive sheathing 750 to a spectrometer or other ground reference.

Figure 12:
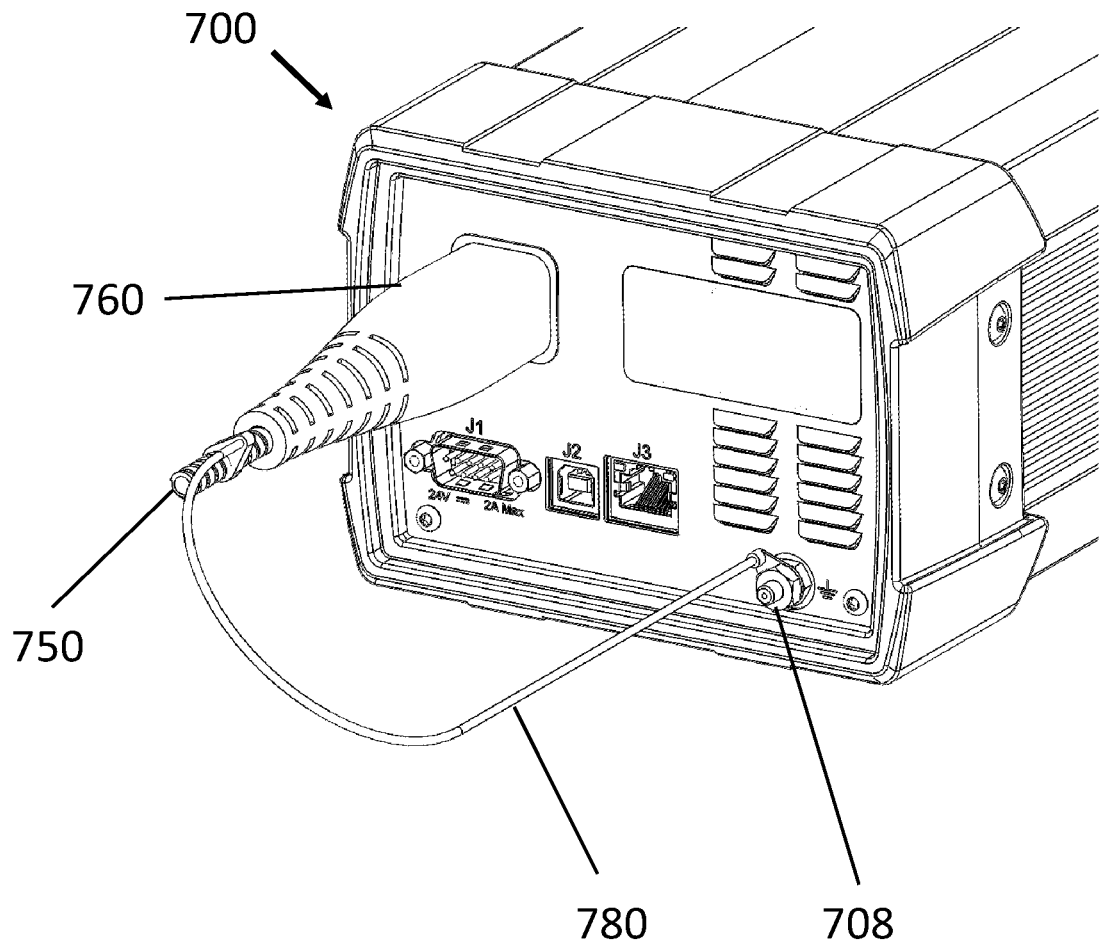
FIG. 12 is an oblique view of an SMA terminated spectrometer with an associated SMA terminated fiber optical cable assembly engaged therewith showing a grounding tether and an isolating boot.

FIG. 12 illustrates an example of fiber optic cable assembly 726 connected to spectrometer 700. In FIG. 12 the grounding tether 780 is shown engaged with the grounding lug 708 and the non-conductive boot 760 is positioned over the SMA connection assembly 130 (not visible). The non-conductive boot 760 can be positioned flush and against the back of the spectrometer 700. For example, the non-conductive boot 760 can be slid into place.

Figure 13:
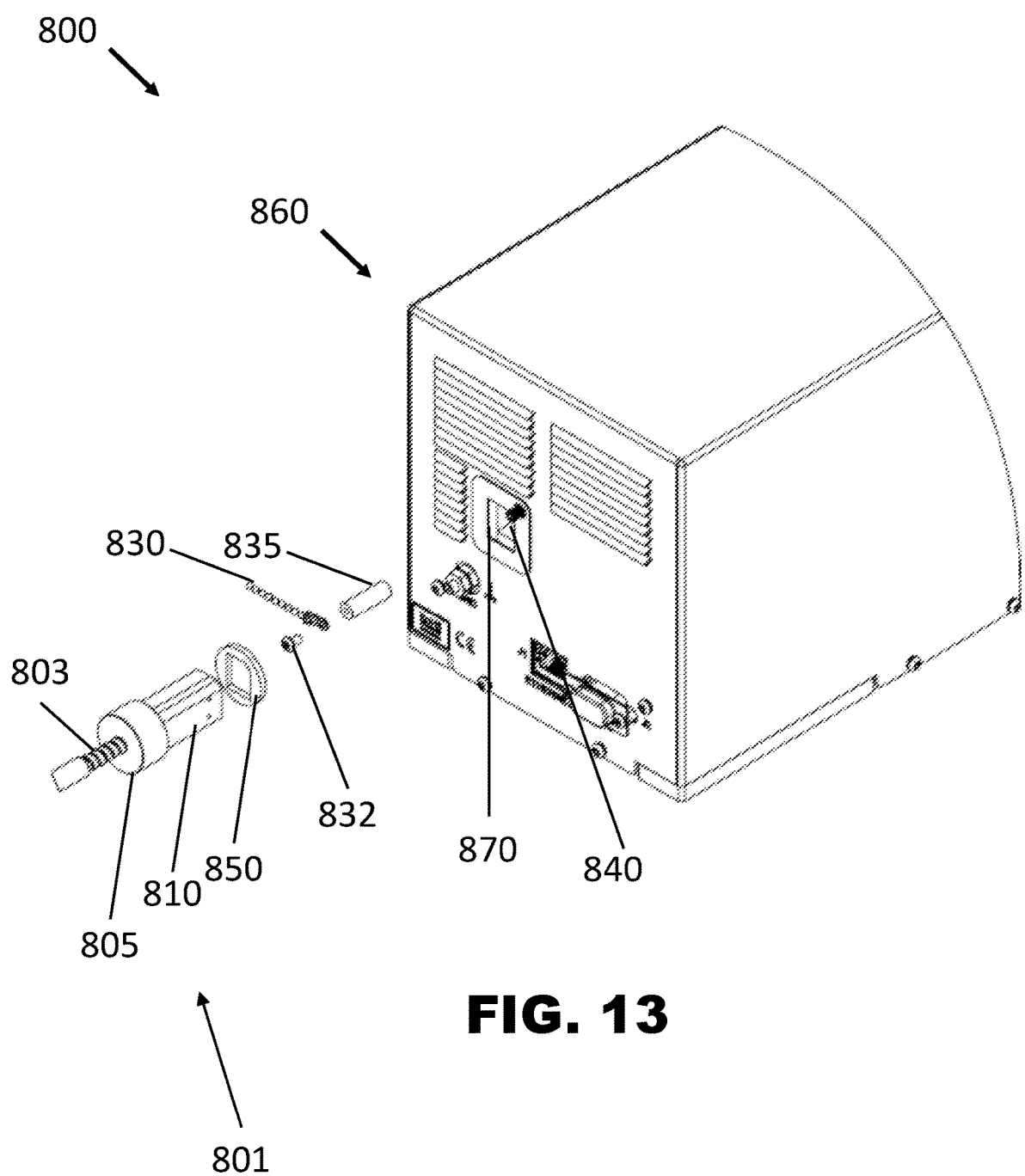
FIG. 13 is an oblique view of a fiber optical cable assembly including a dielectric shield and integrated dielectric break with an associated tether and cover for a retaining feature.

FIG. 13 illustrates an oblique view of an example of a fiber optically coupled system 800 having a fiber optical cable assembly 801 that is disengaged from a spectrometer 860. The fiber optical cable assembly 801 includes sheathing 803, a dielectric shield 805, a termination 810, a tether 830, and a cover 835. The fiber optical cable assembly 801 also includes an integrated dielectric break (not shown as hidden by termination 810). The sheathing 803 can be conductive sheathing, such as sheathing 150. The fiber optical cable assembly 801 also includes compliant member 850.

The spectrometer 860 includes a retainer 840 and a fiber optical access 870. The spectrometer 100 also includes additional visible features that are common to spectrometers, such as interfaces and vents. To engage fiber optical cable assembly 801 with spectrometer 860, termination 810 may be inserted into fiber optical access 870.

Compliant member 850 provides compliance and "gap fill" between dielectric shield 805 and spectrometer 860 when termination 810 is inserted into fiber optical access 870. Compliant member 850 may provide mechanical compliance as well as dielectric isolation and inhibition of mechanical or particle access to conductive portions of the termination 810. Compliant member 850 may be formed from a compressible material such as PORON or other material, such as silicone foam rubber, which provides suitable mechanical properties to avoid significant mechanical stresses between termination 810 and fiber optical access 870 while supporting required dielectric and limitation of access properties for ESD and EMI protection.

The compliant member 850 can be a donut-shaped device wherein the termination 810 fits through the hole of the device and into the fiber optical access 870, where the termination 810 is secured in place by the retainer 840, which can be a screw. Cover 835 can be placed over the retainer 840 when the fiber optical cable assembly 801 is connected to the spectrometer 860. Compliant member 850 may be secured to the dielectric shield 805 and/or the termination 810 via, for example, an adhesive. Compliant member 850 may be permanently or removeably secured or attached to at least one of the dielectric shield 805 and the termination 810. A permanent attachment means no removal without physical destruction.

Tether 830 and cover 835 may be formed of suitable dielectric materials such as vinyl, PEEK, nylon, or other polymers. For example, tether 830 may be a section of nylon ball chain and cover 835 may be a molded vinyl cap. Cover 835 may be configured for either "press-on" or "thread-on" installation over the retainer 840 or other retaining means. The tether 830 is coupled to the cover 835, such as via a non-conductive screw 832 or other mechanical means, to retain the cover 835 and keep it from being misplaced. As such, one end of the tether 830 is connected to the cover 835 and the other end of the tether 830 is secured to, for example, the spectrometer 860 or even some portion of fiber optical cable assembly 800. In some examples, the tether 830 and cover 835 may be considered part of fiber optically coupled system 800 that includes a fiber optic cable assembly 801.

Those skilled in the art to which this application relates will appreciate that other and further additions, deletions, substitutions and modifications may be made to the described embodiments.

The preceding description includes details to impart a thorough understanding of the various examples of the disclosure. Upon having read and understood the specification, claims and drawings hereof, however, those skilled in the art will understand that some embodiments of the disclosure may be practiced without hewing to some of the specific details set forth herein. Moreover, to avoid obscuring the disclosure, some well-known methods, processes, devices, and systems finding application in the various embodiments described herein are not disclosed in detail.

Features described above as well as those claimed below may be combined in various ways without departing from the scope hereof. It should thus be noted that the matter contained in the above description or shown in the accompanying drawings should be interpreted as illustrative and not in a limiting sense. The above-described embodiments should be considered as examples, rather than as limiting the scope of the disclosure. In addition to the foregoing embodiments, review of the detailed description and accompanying drawings will show that there are other embodiments. Accordingly, many combinations, permutations, variations and modifications of the foregoing embodiments not set forth explicitly herein will nevertheless fall within the scope of such inventions. The following claims are intended to cover generic and specific features described herein, as well as all statements of the scope of the present method and system, which, as a matter of language, might be said to fall there between.

Various aspects of the disclosure can be claimed including the apparatuses, systems, and methods disclosed herein. Aspects disclosed herein include:

A. A fiber optical cable assembly including: (1) a termination, (2) sheathing, and (3) a dielectric break providing electrical isolation between the termination and the sheathing.

B. A fiber optical cable assembly, including: (1) (1) a termination, (2) sheathing, and (3) electrical isolation/insulation (EII) protection for at least one of the termination and the sheathing.

C. A fiber optically coupled system, including: (1) a spectrometer and (2) a fiber optic cable assembly coupled to the spectrometer, wherein the fiber optic cable assembly includes (2A) a termination, (2B) sheathing, and (2C) electrical isolation/insulation (EII)

protection for the spectrometer, wherein the EII protection is used with at least one of the termination and the sheathing.

Each of aspects A, B, and C can have one or more of the following additional elements in combination: Element 1: further comprising a non-conductive sheathing at least partially covering the termination and the sheathing. Element 2: wherein the termination and sheathing are comprised of a conductive material. Element 3: wherein the dielectric break is configured to isolate a DC discharge of 1000 volts or more. Element 4: wherein the termination and dielectric break are a common portion of the fiber optical cable assembly. Element 5: wherein the dielectric break comprises one of PEEK, alumina, Delrin, and UHMW polyethylene. Element 6: wherein the dielectric break comprises PEEK. Element 7: wherein the non-conductive sheathing comprises one of polyethylene, polyvinyl chloride, polytetrafluoroethylene, fluorinated ethylene propylene, polypropylene, a rubber, neoprene, polyurethanes, silicone and polyolefins. Element 8: wherein the termination is a custom termination. Element 9: wherein the termination is a standard termination. Element 10: further comprising an insulating boot. Element 11: further comprising a grounding tether. Element 12: further comprising a compliant member. Element 13: wherein the compliant member is adhesively secured to the termination. Element 14: wherein the dielectric break is integrated within the termination. Element 15: further comprising a dielectric shield that cooperates with the dielectric break in providing the electrical isolation between the termination and the sheathing. Element 16: wherein the EII protection includes a dielectric break providing electrical isolation between the termination and the sheathing. Element 17: wherein the EII protection includes a non-conductive sheathing at least partially covering the termination and the sheathing. Element 18: wherein the EII protection includes an isolation boot. Element 19: wherein the EII protection includes a grounding tether. Element 20: wherein the EII protection includes a combination of at least two of a non-conductive sheathing at least partially covering the termination and the sheathing, a dielectric break providing electrical isolation between the termination and the sheathing, an isolation boot, and a grounding tether. Element 21: wherein the EII protection includes a dielectric break providing electrical isolation between the termination and the sheathing. Element 22: wherein the EII protection includes a non-conductive sheathing at least partially covering the termination and the sheathing. Element 23: wherein the EII protection includes an isolation boot. Element 24: wherein the EII protection includes a grounding tether. Element 25: wherein the EII protection includes a combination of at least two of a non-conductive sheathing at least partially covering the termination and the sheathing, a dielectric break providing electrical isolation between the termination and the sheathing, an isolation boot, and a grounding tether. Element 26: wherein the EII protection includes a dielectric shield and an integrated dielectric break providing electrical isolation between the termination and the sheathing. Element 27: wherein the EII protection further includes a compliant member. Element 28: wherein the spectrometer includes a retainer for securing the termination and the fiber optically coupled system further includes a cover for the retainer and a non-conductive tether attached to the cover. Element 29: further comprising a light source optically coupled to the fiber optic cable assembly, wherein the fiber optic cable assembly provides light from the light source to the spectrometer. Element 30: wherein the light source is a flashlamp.

What is claimed is:

1. A fiber optical cable assembly, comprising;
   a termination;
   sheathing;
   a dielectric break providing electrical isolation between the termination and the sheathing; and
   a non-conductive sheathing at least partially covering the termination and the sheathing.

2. The fiber optical cable assembly of claim 1, wherein the termination and sheathing are comprised of a conductive material.

3. The fiber optical cable assembly of claim 1, wherein the dielectric break is configured to isolate a DC discharge of 1000 volts or more.

4. The fiber optical cable assembly of claim 1, wherein the termination and dielectric break are a common portion of the fiber optical cable assembly.

5. The fiber optical cable assembly of claim 1, wherein the dielectric break comprises one of PEEK, alumina, Delrin, and UHMW polyethylene.

6. The fiber optical cable assembly of claim 1, wherein the dielectric break comprises PEEK.

7. The fiber optical cable assembly of claim 1, wherein the non-conductive sheathing comprises one of polyethylene, polyvinyl chloride, polytetrafluoroethylene, fluorinated ethylene propylene, polypropylene, a rubber, neoprene, polyurethanes, silicone and polyolefins.

8. The fiber optical cable assembly of claim 1, wherein the termination is a custom termination.

9. The fiber optical cable assembly of claim 1, wherein the termination is a standard termination.

10. The fiber optical cable assembly of claim 1, further comprising an insulating boot.

11. The fiber optical cable assembly of claim 1, further comprising a grounding tether.

12. The fiber optic cable assembly of claim 1, further comprising a compliant member.

13. The fiber optic cable assembly of claim 12, wherein the compliant member is adhesively secured to the termination.

14. The fiber optic cable assembly of claim 12, wherein the dielectric break is integrated within the termination.

15. The fiber optic cable assembly of claim 1, further comprising a dielectric shield that cooperates with the dielectric break in providing the electrical isolation between the termination and the sheathing.

16. A fiber optical cable assembly, comprising:
    a termination;
    sheathing; and
    electrical isolation/insulation (EII) protection for at least one of the termination and the sheathing, wherein the EII protection includes a non-conductive sheathing at least partially covering the termination and the sheathing.

17. The fiber optical cable assembly of claim 16, wherein the EII protection includes a dielectric break providing electrical isolation between the termination and the sheathing.

18. The fiber optical cable assembly of claim 16, wherein the EII protection includes an isolation boot.

19. The fiber optical cable assembly of claim 16, wherein the EII protection includes a grounding tether.

20. The fiber optical cable assembly of claim 16, wherein the EII protection includes a combination of at least two of a non-conductive sheathing at least partially covering the termination and the sheathing, a dielectric break providing electrical isolation between the termination and the sheathing, an isolation boot, and a grounding tether.

21. A fiber optically coupled system, comprising:
a spectrometer; and
a fiber optic cable assembly coupled to the spectrometer, wherein the fiber optic cable assembly includes:
a termination,
sheathing, and
electrical isolation/insulation (EII) protection for the spectrometer, wherein the EII protection is used with at least one of the termination and the sheathing and wherein the EII protection includes a non-conductive sheathing at least partially covering the termination and the sheathing.

22. The fiber optically coupled system of claim 21, wherein the EII protection includes a dielectric break providing electrical isolation between the termination and the sheathing.

23. The fiber optically coupled system of claim 21, wherein the EII protection includes an isolation boot.

24. The fiber optically coupled system of claim 21, wherein the EII protection includes a grounding tether.

25. The fiber optically coupled system of claim 21, wherein the EII protection includes a combination of at least two of a non-conductive sheathing at least partially covering the termination and the sheathing, a dielectric break providing electrical isolation between the termination and the sheathing, an isolation boot, and a grounding tether.

26. The fiber optically coupled system of claim 21, wherein the EII protection includes a dielectric shield and an integrated dielectric break providing electrical isolation between the termination and the sheathing.

27. The fiber optically coupled system of claim 26, wherein the EII protection further includes a compliant member.

28. The fiber optically coupled system of claim 21, wherein the spectrometer includes a retainer for securing the termination and the fiber optically coupled system further includes a cover for the retainer and a non-conductive tether attached to the cover.

29. The fiber optically coupled system of claim 21, further comprising a light source optically coupled to the fiber optic cable assembly, wherein the fiber optic cable assembly provides light from the light source to the spectrometer.

30. The fiber optically coupled system of claim 29, wherein the light source is a flashlamp.

* * * * *